(12) United States Patent
Nakasu (10) Patent No.: US 11,577,391 B2
(45) Date of Patent: Feb. 14, 2023

(54) TRAJECTORY GENERATION DEVICE, TRAJECTORY GENERATION METHOD, AND ROBOT SYSTEM

(71) Applicant: HITACHI, LTD., Tokyo (JP)

(72) Inventor: Nobuaki Nakasu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 491 days.

(21) Appl. No.: 16/683,350

(22) Filed: Nov. 14, 2019

(65) Prior Publication Data

US 2020/0198137 A1 Jun. 25, 2020

(30) Foreign Application Priority Data

Dec. 25, 2018 (JP) .............................. JP2018-240926

(51) Int. Cl.
*B25J 9/16* (2006.01)

(52) U.S. Cl.
CPC ... *B25J 9/1664* (2013.01); *G05B 2219/40446* (2013.01); *G05B 2219/40454* (2013.01)

(58) Field of Classification Search
CPC ...... B25J 9/1651; B25J 9/1638; B25J 9/1664; G05B 2219/40446; G05B 2219/40448; G05B 2219/40454; G05B 2219/40463; G05B 2219/40465; G05B 2219/40466
See application file for complete search history.

(56) References Cited

U.S. PATENT DOCUMENTS

| | | | |
|---|---|---|---|
| 2019/0217468 A1* | 7/2019 | Ogata | B25J 9/1633 |
| 2019/0240833 A1* | 8/2019 | Kimura | B25J 9/1664 |
| 2020/0001862 A1* | 1/2020 | Luo | G06V 20/58 |

FOREIGN PATENT DOCUMENTS

| | | |
|---|---|---|
| JP | 2002-73130 A | 3/2002 |
| JP | 2006-119958 A | 5/2006 |

OTHER PUBLICATIONS

Chinese Office Action received in corresponding Chinese Application No. 201911266701.9 dated Nov. 29, 2022.

* cited by examiner

*Primary Examiner* — Spencer D Patton
(74) *Attorney, Agent, or Firm* — Mattingly & Malur, PC

(57) ABSTRACT

A trajectory generation device which generates a trajectory of a robot includes: a trajectory exploration graph generation unit which is configured to generate a trajectory exploration graph composed of a plurality of nodes for generating the trajectory; an acceleration upper limit value acquisition unit which is configured to acquire a first acceleration upper limit value based on orientations and an acceleration direction of the robot at a current node; a velocity and acceleration setting unit which is configured to set a first velocity representing a velocity when moving from the current node to a next node adjacent to the current node based on the acquired first acceleration upper limit value, and an acceleration; and a node cost calculation unit which is configured to calculate a moving time by using the set first velocity and the acceleration as cost from the current node to the next node.

5 Claims, 8 Drawing Sheets

| DISTANCE TO OBSTACLE | mm/s |
|---|---|
| <50mm | 30 |
| <100mm | 300 |
| <300mm | 1000 |
| <500mm | 1500 |

| WEIGHT OF GRIPPED OBJECT | POSITION AND ORIENTATIONS | | | | | | ACCELERATION DIRECTION | | | | | | ACCELERATION UPPER LIMIT VALUE $a_{max}$ |
|---|---|---|---|---|---|---|---|---|---|---|---|---|---|
| | $j_1$ | $j_2$ | $j_3$ | $j_4$ | $j_5$ | $j_6$ | $\ddot{j}_1$ | $\ddot{j}_2$ | $\ddot{j}_3$ | $\ddot{j}_4$ | $\ddot{j}_5$ | $\ddot{j}_6$ | |
| 2kg | 100 | 0 | 300 | 0 | 0 | 0 | 1 | 0 | 0 | 0 | 0 | 0 | 150 |
| 4kg | 100 | 0 | 300 | 0 | 0 | 0 | 0 | 1 | 0 | 0 | 0 | 0 | 90 |
| ⋮ | | | | | | | | | | | | | |
| | | | | | | | | | | | | | |
| | | | | | | | | | | | | | |

| | ACCELERATION DIRECTION | | | | | | GRIPPING DISTANCE FROM CENTER OF GRAVITY | | | ACCELERATION UPPER LIMIT VALUE $a'_{max}$ |
|---|---|---|---|---|---|---|---|---|---|---|
| FRICTION COEFFICIENT | $\ddot{x}$ | $\ddot{y}$ | $\ddot{z}$ | $\ddot{\phi}$ | $\ddot{\theta}$ | $\ddot{\psi}$ | x | y | z | |
| 0.2 | 1 | 0 | 0 | 0 | 0 | 0 | 1 | 0 | 0 | 1000 |
| 0.3 | 1 | 0 | 1 | 0 | 0 | 0 | 1 | 0 | 0 | 900 |
| 0.2 | 0 | 0 | 0 | 1 | 0 | 0 | 0 | 1 | 0 | 800 |
| ⋮ | | | | | | | | | | |

TRAJECTORY GENERATION DEVICE, TRAJECTORY GENERATION METHOD, AND ROBOT SYSTEM

CROSS-REFERENCE TO RELATED APPLICATION

The present application claims priority from Japanese application JP 2018-240926, filed on Dec. 25, 2018, the contents of which is hereby incorporated by reference into this application.

TECHNICAL FIELD

The present invention relates to a trajectory generation device, a trajectory generation method, and a robot system.

BACKGROUND ART

Patent Literature 1 discloses "a control device for an articulated robot that includes a rotation arm having a plurality of rotation axes driven by a motor and operates according to a program taught in advance, and the control device for the articulated robot is provided with an unit that calculates an allowable maximum acceleration at a current position and a target position of the rotation axis by an inertia term of the arm around the corresponding rotation axis calculated from rotational position information of the current position and the target position of the motor and a gravity term calculated in consideration of direction information which accelerates the arm".

PRIOR ART LITERATURE

Patent Literature

PTL 1: JP-A-2006-119958

SUMMARY OF INVENTION

Technical Problem

In general, a robot provided with an arm having a hand at a tip end varies in velocity at which the hand can be moved depending on orientations of the arm. That is, the robot has a capability to move the hand faster when the arm is contracted than when the arm is extended.

However, in the related art, when a trajectory of such a robot is set, an acceleration upper limit value in a state where the arm is extended is a common acceleration upper limit value in all orientations. Therefore, for example, the robot cannot move the hand at a velocity that is originally possible in a state or the like where the arm is contracted, and cannot make full use of the capability.

In the control device described in Patent Literature 1, the allowable maximum acceleration is calculated in consideration of the orientations of the robot at the current position and the target position (a start point and an endpoint of the trajectory). However, since the orientations of the robot in the middle of the trajectory are not taken into consideration, it is difficult to say that the control device described in Patent Literature 1 can make full use of the capability of the robot.

The invention has been made in view of such a situation, and an object thereof is to generate a trajectory that allows a robot to operate faster.

Solution to Problem

The present application includes a plurality of means that solve at least a part of the above problems, and an example of the plurality of means is as follows.

In order to solve the above problems, a trajectory generation device according to an aspect of the invention is a trajectory generation device which generates a trajectory of a robot. The trajectory generation device includes: a trajectory exploration graph generation unit which is configured to generate a trajectory exploration graph composed of a plurality of nodes for generating the trajectory; an acceleration upper limit value acquisition unit which is configured to acquire a first acceleration upper limit value based on orientations and an acceleration direction of the robot at a current node; a velocity and acceleration setting unit which is configured to set a first velocity representing a velocity when moving from the current node to a next node adjacent to the current node based on the acquired first acceleration upper limit value, and an acceleration; a node cost calculation unit which is configured to calculate a moving time by using the set first velocity and the set acceleration as cost from the current node to the next node; and a trajectory exploration unit which is configured to explore, based on the calculated cost, a path of the node having a minimum total cost in the trajectory exploration graph as the trajectory.

Advantageous Effect

According to an embodiment of the invention, it is possible to generate the trajectory that allows the robot to operate faster.

Problems, configurations, and effects other than the above subject matters will become more obvious based on descriptions of the below-mentioned embodiments.

DESCRIPTION OF EMBODIMENTS

Hereinafter, an embodiment of the invention will be described with reference to the drawings. Note that, throughout all the drawings for describing the present embodiment, the same members are assigned the same reference numerals as a general rule, and repetitive descriptions are omitted. Further, in the embodiments described below, it goes without saying that the components (including element steps and the like) are not always indispensable unless otherwise stated or except the case where the components are apparently indispensable in principle. In addition, when saying "formed of A", "composed of A", "have A", and "include A", unless specifically stated that only the element is specified, it is needless to say that elements other than the element are not excluded. Similarly, in the embodiments described below, when the shape of the components, a positional relation thereof, and the like are mentioned, the substantially approximate and similar shapes and the like are included unless otherwise stated or except the case where it can be conceived that they are apparently excluded in principle.

Configuration Example of Robot System 10 According to Embodiment of Invention

Figure 1:
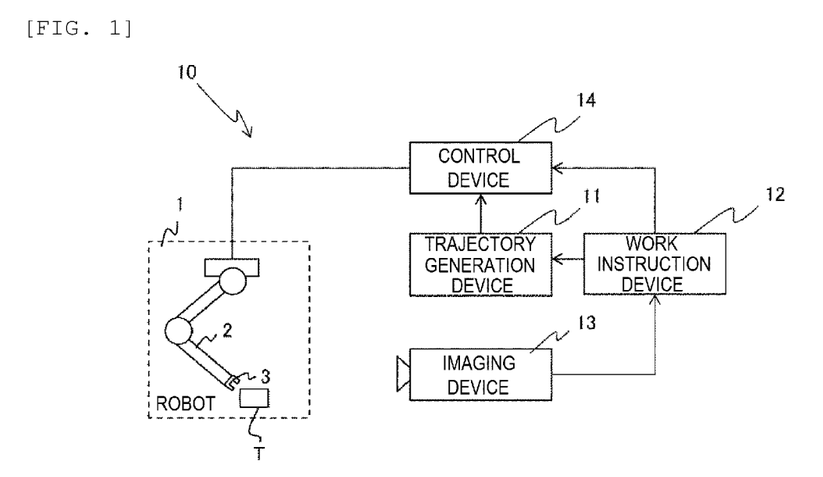
FIG. 1 is a diagram illustrating a configuration example of a robot system according to an embodiment of the invention.

FIG. 1 shows a configuration example of a robot system 10 according to an embodiment of the invention.

The robot system 10 includes a robot 1, a trajectory generation device 11, a work instruction device 12, an imaging device 13, and a control device 14.

The robot 1 is, for example, an articulated robot having six axes (six joints), and includes a plurality of arms 2 and hands 3. The hand 3 is attached to a tip end of the arm 2. The hand 3 includes a plurality of fingers (for example, fingers 31 to 34 in FIG. 12), and can grip an object (gripped object) T. The number of axes of the robot 1 and the number of fingers of the hand 3 are not limited to the above example.

In the present embodiment, a position and orientations of the hand 3 are represented by rotation angles ($j_1$, $j_2$, $j_3$, $j_4$, $j_5$, $j_6$) of the six axes (joints) of the robot, or xyz coordinates of a predetermined reference point of the hand 3 and rotation angles (x, y, z, $\phi$, $\theta$, $\psi$) around xyz axes. The position and the orientations of the hand 3 can be read as orientations of the robot 1.

The trajectory generation device 11 generates a trajectory of the hand 3 according to a start point and an end point of the trajectory reported from the work instruction device 12, and outputs trajectory information to the control device 14.

The work instruction device 12 determines the start point and the end point of the trajectory through which the hand 3 passes when the robot 1 performs work based on, for example, an input from a user, and notifies the trajectory generation device 11 of the start point and the end point. In addition, the work instruction device 12 may determine the start point and the endpoint of the trajectory based on a peripheral image of the robot 1 input from the imaging device 13, and notify the trajectory generation device 11 of the start point and the end point.

The imaging device 13 images a periphery including the robot 1 and outputs the peripheral image obtained as a result to the work instruction device 12.

The control device 14 controls an operation of the robot 1 based on trajectory information input from the trajectory generation device 11.

First Configuration Example of Trajectory Generation Device 11

Figure 2:
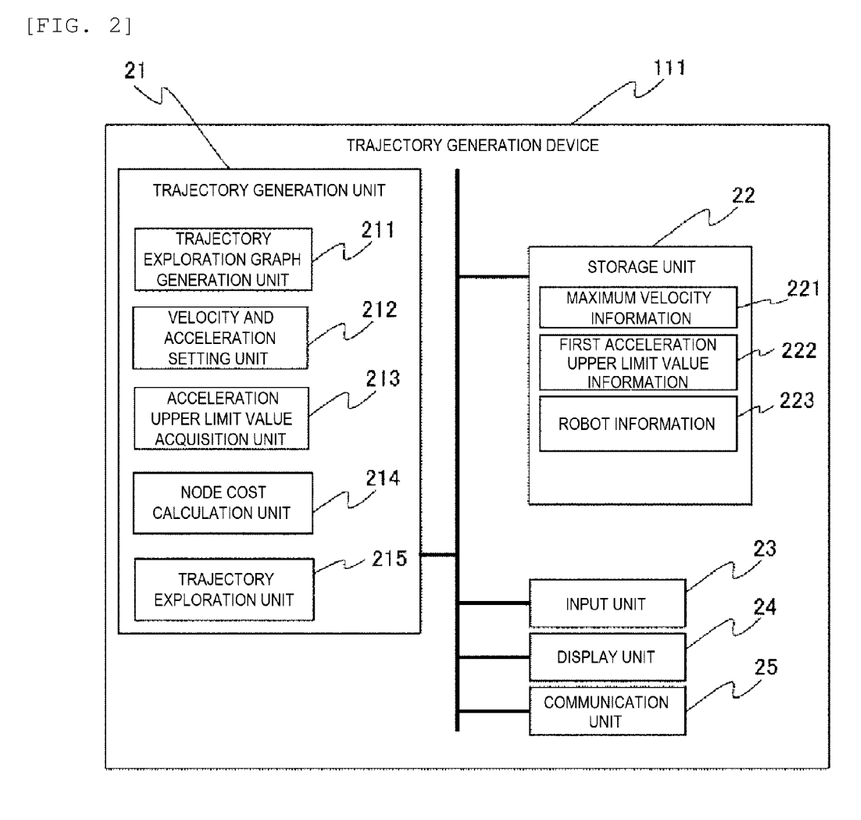
FIG. 2 is a functional block diagram illustrating a first configuration example of a trajectory generation device.

Next, FIG. 2 shows a trajectory generation device 111 that is a first configuration example of the trajectory generation device 11.

The trajectory generation device 111 is composed of a Personal Computer (PC) including a Central Processing Unit (CPU), a memory, a storage, and the like. The trajectory generation device 111 includes a trajectory generation unit 21, a storage unit 22, an input unit 23, a display unit 24, and a communication unit 25.

The trajectory generation unit 21 includes functional blocks of a trajectory exploration graph generation unit 211, a velocity and acceleration setting unit 212, an acceleration upper limit value acquisition unit 213, a node cost calculation unit 214, and a trajectory exploration unit 215. Each of the functional blocks of the trajectory generation unit 21 is implemented by the CPU of the PC executing a predetermined program.

The trajectory exploration graph generation unit 211 generates a trajectory exploration graph used for trajectory generation. The velocity and acceleration setting unit 212 acquires a velocity V of a current node in the trajectory generation. The velocity V corresponds to a second velocity of the invention. In addition, the velocity and acceleration setting unit 212 acquires a velocity V' from the current node to a next node by referring to maximum velocity information 221 based on a distance between the current node and an obstacle. The velocity V' corresponds to the second velocity of the invention. Further, the velocity and acceleration setting unit 212 calculates an acceleration a from the current node to the next node based on the velocity V and the velocity V'.

The acceleration upper limit value acquisition unit 213 acquires an acceleration upper limit value $a_{max}$ based on the position, the orientations, and an acceleration direction of the hand 3 at the current node with reference to first acceleration upper limit value information 222. The acceleration upper limit value $a_{max}$ corresponds to the first acceleration upper limit value of the invention.

The node cost calculation unit 214 calculates cost when the hand 3 moves from the current node to the next node. In the present embodiment, moving time from the current node to the next node is calculated as the cost.

The trajectory exploration unit 215 explores, based on the calculated cost, a path having a minimum total cost as the trajectory.

In the storage unit 22, the maximum velocity information 221, the first acceleration upper limit value information 222, and robot information 223 are stored in advance. The storage unit 22 is implemented by, for example, the storage or the memory of the PC.

Figure 3:
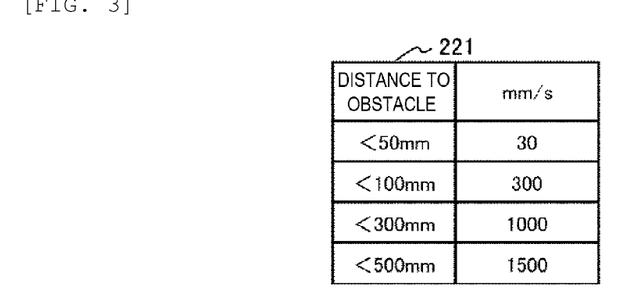
FIG. 3 is a diagram illustrating an example of maximum velocity information.

FIG. 3 shows an example of the maximum velocity information 221. In the maximum velocity information 221, a maximum velocity is recorded in association with the distance between the current node and the obstacle according to a weight of the gripped object. The maximum velocity is a value determined in advance by predetermined calculation or supervised learning. For example, when the distance between the node and the obstacle is less than 50 [mm], the maximum velocity is set to 30 [mm/s]. In addition, for example, when the distance between the node and the obstacle is 50 or more and less than 100 [mm], the maximum velocity is set to 300 [mm/s].

Figure 4:
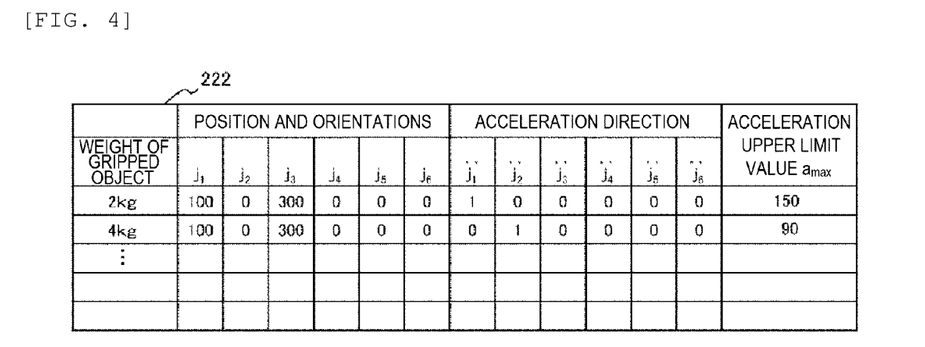
FIG. 4 is a diagram illustrating an example of first acceleration upper limit value information.

FIG. 4 shows an example of the first acceleration upper limit value information 222. In the first acceleration upper limit value information 222, the acceleration upper limit value $a_{max}$ is recorded in association with the position and the orientations of the hand 3 and the acceleration direction thereof. The acceleration upper limit value $a_{max}$ is a value determined in advance by predetermined calculation or supervised learning. In an example of FIG. 4, the position, the orientations, and the acceleration direction of the hand 3 are represented by the rotation angles of the six axes of the robot 1, and in this case, a maximum acceleration may be read as a maximum angular acceleration. The position and the orientations of the hand 3 and the acceleration direction thereof in the first acceleration upper limit value information 222 may be represented by using the xyz coordinates of the hand 3 and the rotation angles around the xyz axes.

Return to FIG. 2. In the robot information 223, respective length of the plurality of arms 2 included in the robot 1, respective operating ranges of the six axes (joints), friction coefficients of the fingers of the hand 3, and the like are recorded.

The input unit 23 receives various operations from the user. The input unit 23 is composed of an input device, for example, a keyboard, a mouse, and the like included in the PC.

The display unit 24 displays, for example, an output screen 50 (FIG. 15) and the like. The display unit 24 is composed of, for example, a display included in the PC.

The communication unit 25 communicates with the work instruction device 12 and the control device 14 via a predetermined network. The communication unit 25 is composed of, for example, a communication module included in the PC.

Trajectory Generation Processing by Trajectory Generation Device 111

Figure 5:
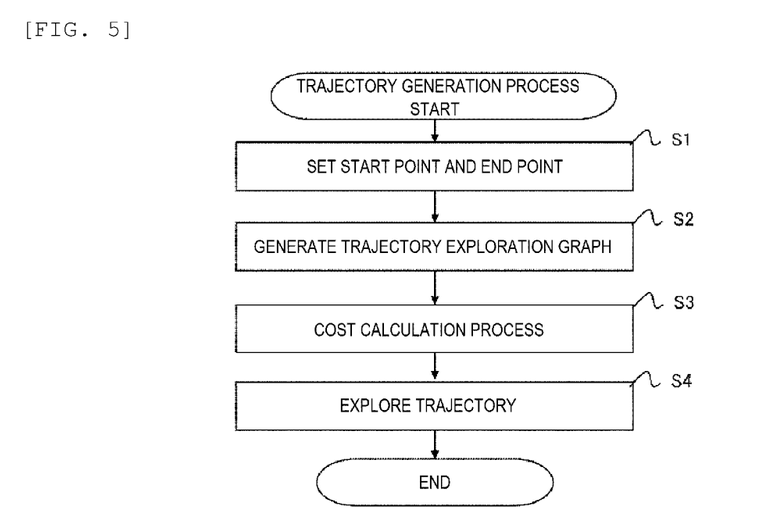
FIG. 5 is a flowchart illustrating an example of a trajectory generation process.

Next, FIG. 5 is a flowchart illustrating an example of the trajectory generation process by the trajectory generation device 111.

The trajectory generation process is started in response to, for example, a predetermined start operation from the user.

First, the trajectory exploration graph generation unit 211 acquires the start point and the end point of the trajectory and the weight of the gripped object T from the work instruction device 12 (step S1). Next, the trajectory exploration graph generation unit 211 generates a trajectory exploration graph in which a plurality of nodes are provided between the start point and the end point of the trajectory (step S2).

Figure 6:
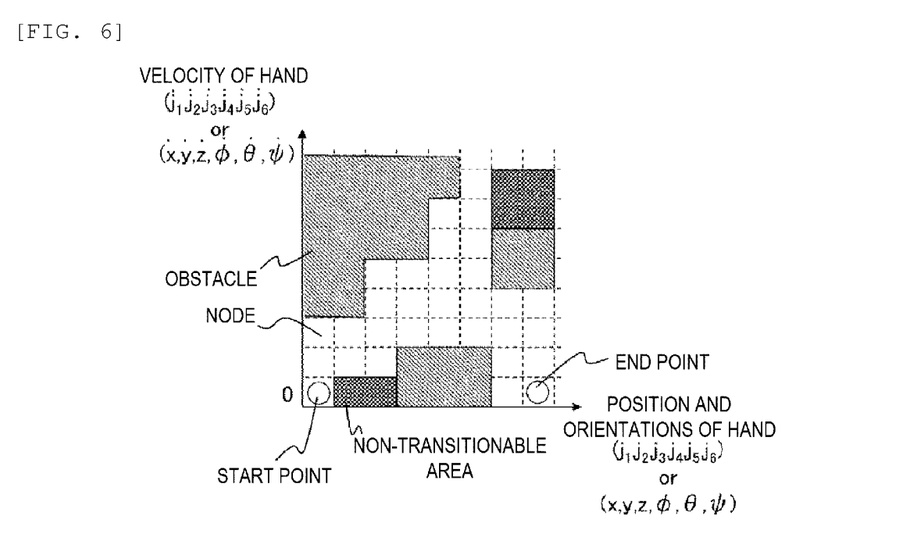
FIG. 6 is a diagram illustrating an example of a trajectory exploration graph.
Figure 7:
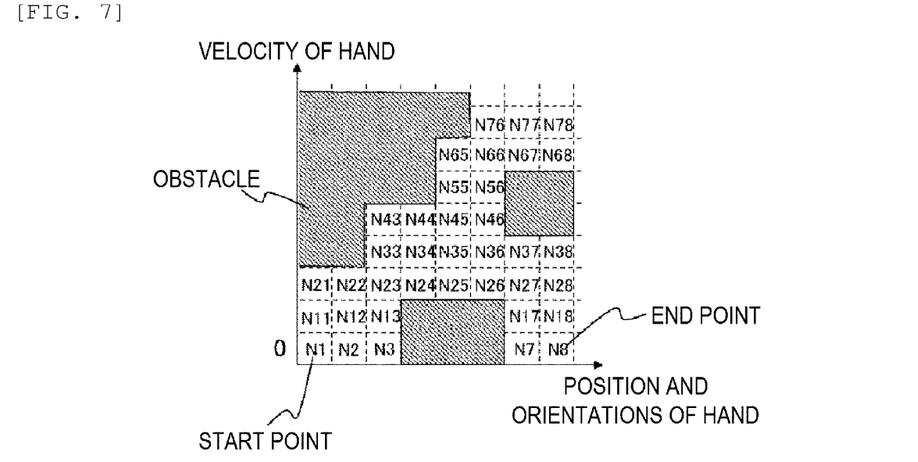
FIG. 7 is a diagram illustrating an example of a trajectory exploration graph to which node numbers are assigned.

FIG. 6 shows an example of the trajectory exploration graph generated by the trajectory exploration graph generation unit 211. FIG. 7 shows an example of node numbers assigned to respective nodes in the trajectory exploration graph. In the case of the present embodiment, the trajectory exploration graph is a two-dimensional space in which a horizontal axis indicates the position and the orientations of the hand 3 and a vertical axis indicates a velocity of the hand 3.

In the trajectory exploration graph, the start point and the end point are set, and positions of the obstacles existing around the robot 1 are masked. Then, for example, as shown in FIG. 7, node numbers (N1, N2, or the like) are assigned to the respective nodes (including the start point, the end point, and a non-transitionable area) in the trajectory exploration graph.

Return to FIG. 5. Next, the velocity and acceleration setting unit 212, the acceleration upper limit value acquisition unit 213, and the node cost calculation unit 214 execute a cost calculation process (step S3).

Figure 8:
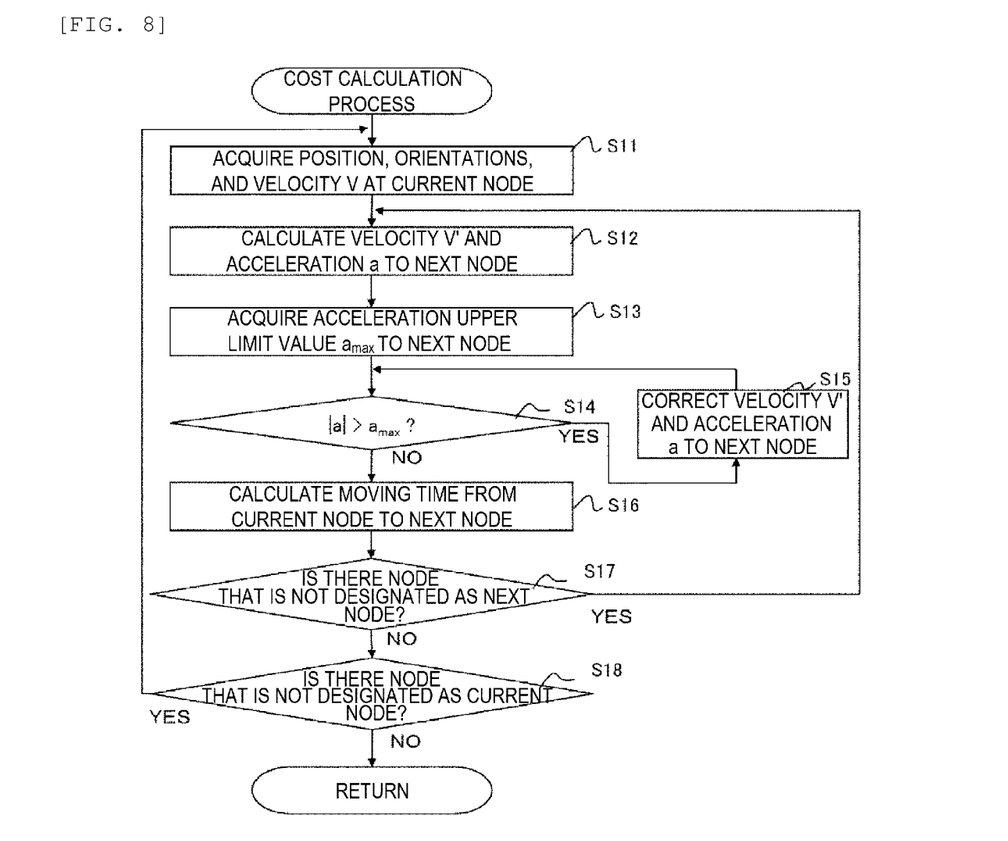
FIG. 8 is a flowchart illustrating an example of a cost calculation process according to the first configuration example of the trajectory generation device.
Figure 9:
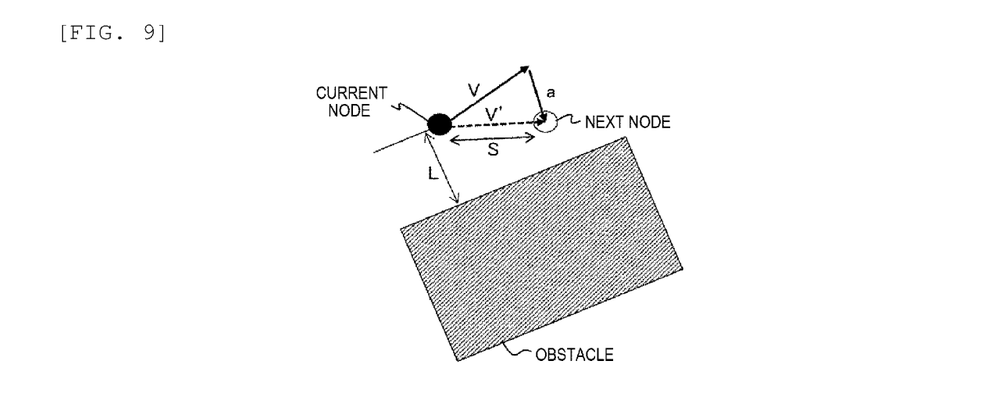
FIG. 9 is a diagram illustrating a positional relationship between a current node and a next node.

FIG. 8 is a flowchart showing an example of the cost calculation process in step S3 in detail. FIG. 9 shows an example of a positional relationship between the current node and the next node. In FIG. 9, V is the velocity of the current node, V' is the velocity from the current node to the next node, a is an acceleration from the velocity V to the velocity V', L is a distance from the current node to the obstacle, and s is a distance between the current node and the next node.

First, the node cost calculation unit 214 sequentially designates all nodes as the current node, acquires the position and the orientations of the current node from the trajectory exploration graph, and notifies the velocity and acceleration setting unit 212 and the acceleration upper limit value acquisition unit 213. In response to the notification, the velocity and acceleration setting unit 212 acquires the velocity V of the current node (step S11). In this case, the start point N1 is first designated as the current node. Then, 0 is acquired as the velocity V at the current node (start point) N1.

Next, the node cost calculation unit 214 sequentially designates nodes (up to eight nodes including diagonal direction) adjacent to the current node in upper-lower and left-right directions as the next nodes. In this case, nodes N11, N12, and N2 are sequentially designated as the next nodes with respect to the current node N1. Then, the velocity and acceleration setting unit 212 acquires the velocity V' from the current node to the next node corresponding to the distance L between the current node and the obstacle by referring to the maximum velocity information 221. Further, the velocity and acceleration setting unit 212 calculates the acceleration a from the current node to the next node according to the following Equation (1) based on the velocity V and the velocity V' (step S12).

(Equation 1)

$$a=(V'-V)\Delta t \qquad (1)$$

Next, the acceleration upper limit value acquisition unit 213 acquires the weight of the gripped object T, the position and the orientations of the hand 3 at the current node, and the acceleration upper limit value $a_{max}$ corresponding to a direction of the acceleration a from the current node to the next node by referring to the first acceleration upper limit value information 222 (step S13).

Next, the velocity and acceleration setting unit 212 determines whether or not an absolute value of the acceleration a calculated in step S12 is larger than the acceleration upper limit value $a_{max}$ acquired in step S13 (step S14). When it is determined that the absolute value of the acceleration a is larger than the acceleration upper limit value $a_{max}$ (YES in step S14), the velocity and acceleration setting unit 212 corrects the velocity V' from the current node to the next node according to the following Equation (2), and accordingly corrects (recalculates) the acceleration a (step S15).

(Equation 2)

$$V'=0.9V' \qquad (2)$$

0.9 in Equation (2) is a coefficient for decelerating the velocity V'. The coefficient is not limited to 0.9 and may be a value less than 1.

Thereafter, when steps S14 and S15 are repeated or step S15 is not executed, and it is determined that the absolute value of the acceleration a is not larger than the acceleration upper limit value $a_{max}$ (the absolute value of the acceleration a is equal to or lower than the acceleration upper limit value $a_{max}$) (NO in step S14), the node cost calculation unit 214 calculates a moving time t as the cost from the current node to the next node by using the velocity V', the acceleration a, and a distance s from the current node to the next node according to the following Equation (3) (step S16).

(Equation 3)

$$t=(-V'+\sqrt{(V'^2+2as)})/a \quad (3)$$

Next, the node cost calculation unit 214 determines whether or not there remains a node that is not designated as the next node among the nodes adjacent to the current node in the upper-lower and left-right directions (step S17). When the node cost calculation unit 214 determines that there remains a node that is not designated as the next node (YES in step S17), the process returns to step S12 to newly designate the next node and step S12 to S17 are repeated. Since the node N2 with respect to the current node N1 is a transition in which the position of the hand 3 is changed while the velocity is 0, the transition from the node N1 to the node N2 is impossible. In this way, when the node in the non-transitionable area is designated as the next node, the processes in steps S12 to S16 are omitted.

Thereafter, when it is determined that no node that is not designated as the next node (NO in step S17) remains, the node cost calculation unit 214 determines whether or not there remains a node that is not designated as the current node among all the nodes (excluding nodes (nodes in which steps S12 to S16 are omitted) for which cost is not calculated as the next nodes) (step S18). When the node cost calculation unit 214 determines that there remains a node that is not designated as the current node (YES in step S18), the process returns to step S11, and one of the nodes for which the cost is calculated among the nodes adjacent to the above current node in the upper-lower and left-right directions is designated as a new current node, the processes subsequent to step S11 are repeated.

Thereafter, when the node cost calculation unit 214 determines that no node that is not designated as the current node remains among all the nodes (excluding nodes (nodes in which steps S12 to S16 are omitted) for which cost is not calculated as the next nodes) (NO in step S18), the node calculation process is completed.

Figure 10:
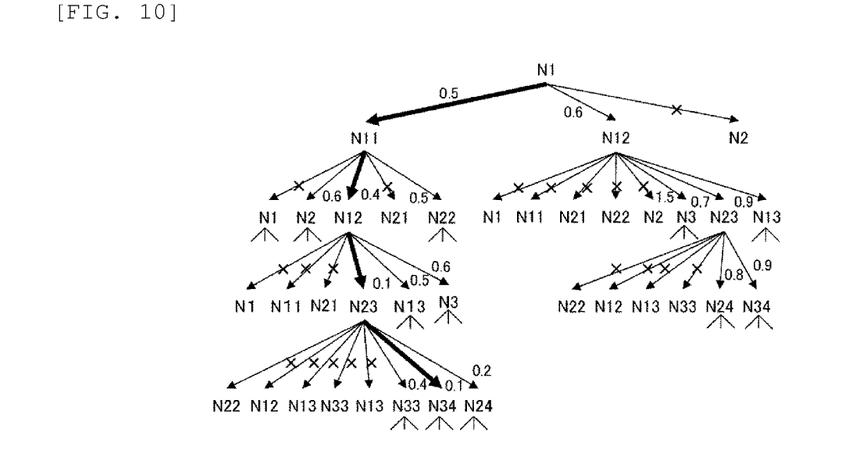
FIG. 10 is a diagram illustrating an example of cost.

FIG. 10 shows an example of the cost obtained as a result of the node calculation process.

For example, when a start node N1 is designated as the current node, the cost to the next node N11 is calculated as 0.5, and the cost to the next node N12 is calculated as 0.6. Since the transition to the next node N2 is impossible, the cost is not calculated. In addition, for example, when the node N11 is designated as the current node, since next nodes N1 and N21 each have a transition in which the position does not change even though the velocity is positive, the cost is not calculated. The cost to the next node N12 is calculated as 0.6, the cost to the next node N21 is calculated as 0.4, and the cost to a next node N22 is calculated as 0.5.

Return to FIG. 5. Next, the trajectory exploration unit 215 explores the path having the minimum total cost as the trajectory based on the result of the cost calculation process as shown in FIG. 10 (step S4). Specifically, as shown by a thick line in FIG. 10, a path which passes through the nodes N1, N11, N23, N34, . . . N8 and achieves a minimum total cost is explored. Then, the trajectory information including the explored path, the velocity V' and the acceleration a from each node to the next node is output from the trajectory generation device 111 to the control device 14. Thus, the description of the trajectory generation process is completed.

As described above, according to the trajectory generation process by the trajectory generation device 111, the acceleration upper limit value $a_{max}$ is set based on the position and the orientations of the hand 3 at each node on the trajectory. Therefore, the moving velocity V' of the hand is not constant and can be changed by making use of the capability of the robot 1, and a trajectory that can move faster can be generated.

Second Configuration Example of Trajectory Generation Device 11

Figure 11:
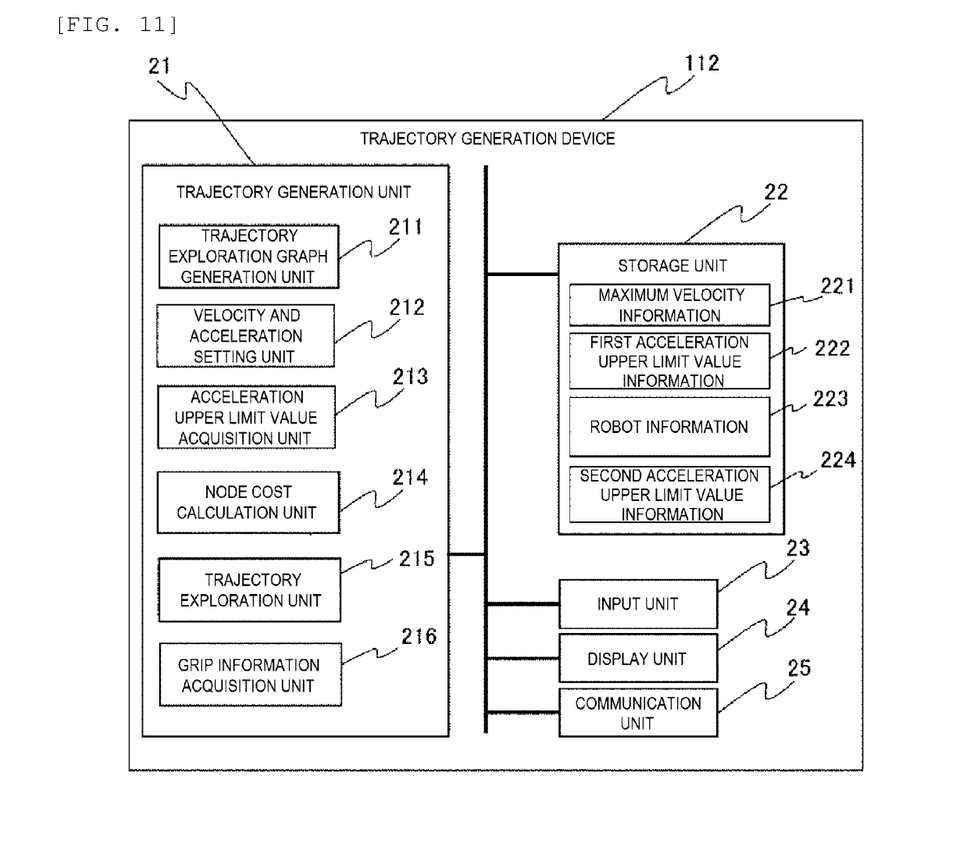
FIG. 11 is a functional block diagram illustrating a second configuration example of the trajectory generation device.

Next, FIG. 11 shows a trajectory generation device 112 that is a second configuration example of the trajectory generation device 11.

The trajectory generation device 112 adds a grip information acquisition unit 216 to the trajectory generation unit 21 and adds second acceleration upper limit value information 224 to the storage unit 22 with respect to the trajectory generation device 111 (FIG. 2). Components of the trajectory generation device 112 which are common to components of the trajectory generation device 111 are denoted by the same reference numerals, and the description thereof will be omitted.

Similarly to the case of the trajectory generation device 111 (FIG. 2), the trajectory generation device 112 sets the acceleration upper limit value $a_{max}$ according to the weight of the gripped object T, sets an acceleration upper limit value $a'_{max}$ according to a gripping state of the gripped object T by the hand 3, and determines the velocity V' from the current node to the next node by adopting the smaller of the acceleration upper limit value $a_{max}$ and the acceleration upper limit value $a'_{max}$. The acceleration upper limit value $a'_{max}$ corresponds to a second acceleration upper limit value of the invention.

Figure 12:
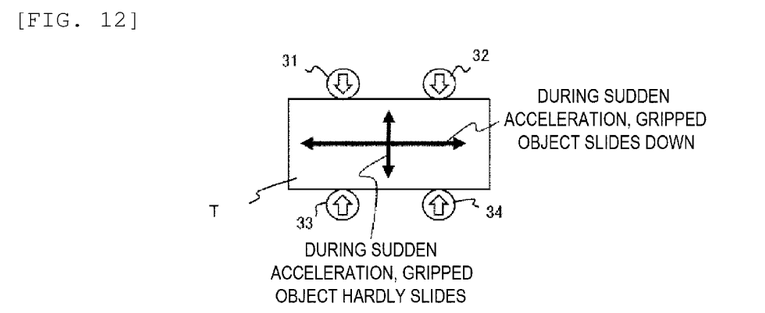
FIG. 12 is a diagram illustrating an example of a gripping state of a gripped object by a hand.

The gripping state of the gripped object T by the hand 3 will be described. FIG. 12 shows an example of the gripping state of the gripped object T by the hand 3.

As shown in FIG. 12, when the four fingers 31 to 34 of the hand 3 grip a long side of the gripped object T by applying force from an upper-lower direction in the figure, even if the hand 3 is accelerated and moved in the upper-lower direction in the figure, the gripped object T hardly slides down, but if the hand 3 is accelerated and moved in a left-right direction in the figure, the gripped object T is likely to slide down. Therefore, in the trajectory generation device 112, when the hand 3 is accelerated and moved in the left-right direction in the figure, the acceleration upper limit value $a'_{max}$ can be set lower than in the case where the hand 3 is accelerated and moved in the upper-lower direction in the figure.

Return to FIG. 11. The grip information acquisition unit 216 acquires the grip information representing the gripping state of the gripped object T by the hand 3 from the control device 14. The grip information includes the acceleration direction when the hand 3 grips and moves the gripped object T, the friction coefficient of the hand 3, and a distance from a grip position of the hand 3 (for example, a center of the four fingers 31 to 34) to a center of gravity of the gripped object T. In addition, the grip information acquisition unit 216 sets the acceleration upper limit value $a'_{max}$ based on the acquired grip information with reference to the second acceleration upper limit value information 224.

Figure 13:
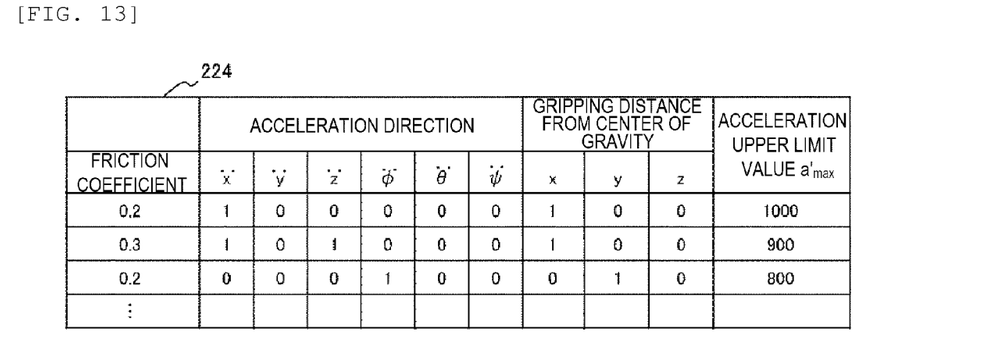
FIG. 13 is a diagram illustrating an example of second acceleration upper limit value information.

FIG. 13 shows an example of the second acceleration upper limit value information 224. In the second acceleration upper limit value information 224, the acceleration upper limit value $a'_{max}$ is recorded in association with the friction coefficients of the fingers 31 to 34 of the hand 3, the acceleration direction of the hand 3, and the distance from the grip position of the hand 3 to the center of gravity of the gripped object T. The acceleration upper limit value $a'_{max}$ is a value determined in advance by predetermined calculation or supervised learning. In the example of FIG. 13, the acceleration direction of the hand 3 is represented by using the xyz coordinates and the rotation angles around the xyz axes, but may be represented by the rotation angles of the six axes of the robot 1.

Trajectory Generation Process by Trajectory Generation Device 112

Next, the trajectory generation process by the trajectory generation device 112 will be described. The trajectory generation process by the trajectory generation device 112 is similar to the trajectory generation process (FIG. 5) by the trajectory generation device 111, but the cost calculation process in step S3 is different. Therefore, an entire description of the trajectory generation process by the trajectory generation device 112 is omitted, and the cost calculation process by the trajectory generation device 112 is described.

Figure 14:
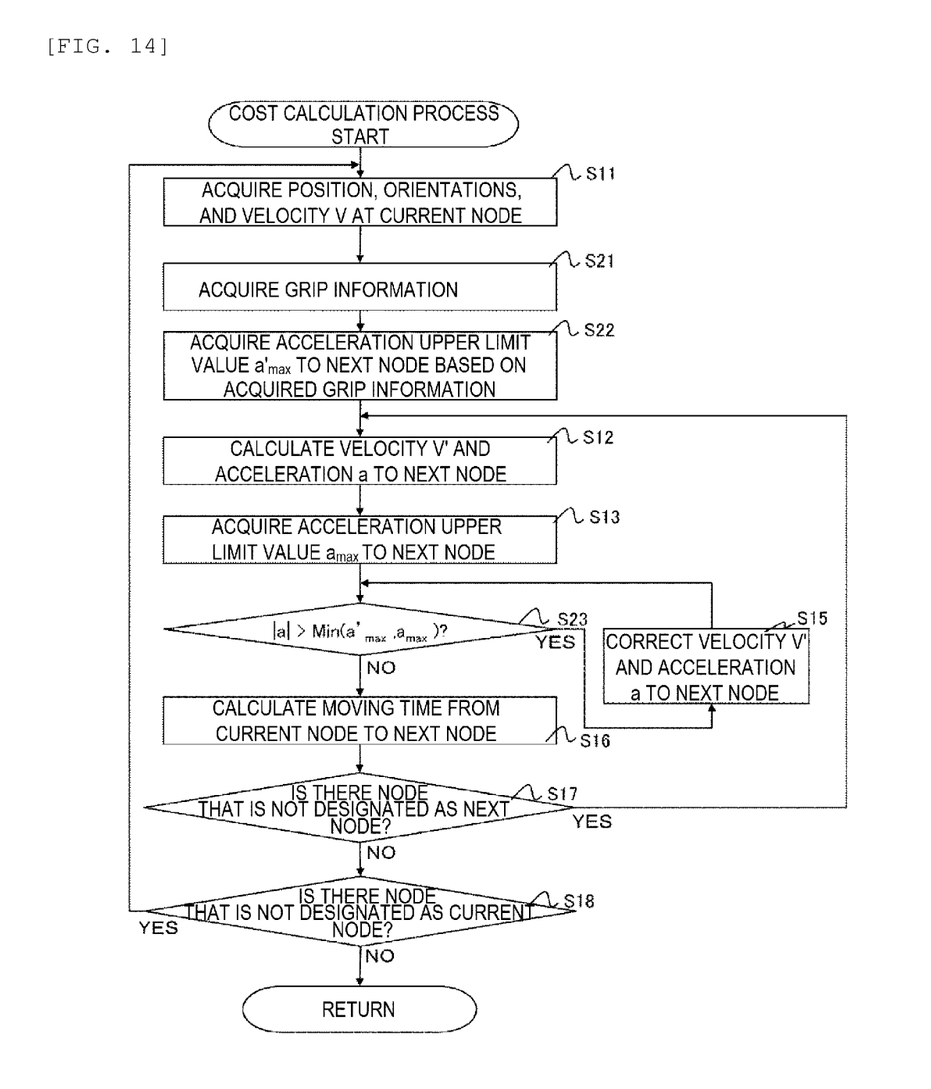
FIG. 14 is a flowchart illustrating an example of a cost calculation process according to the second configuration example of the trajectory generation device.

FIG. 14 is a flowchart showing an example of the cost calculation process by the trajectory generation device 112 in detail.

The cost calculation process by the trajectory generation device 112 adds steps S21 and S22 between step S11 and step S12 and replaces step S14 with S23 with respect to the cost calculation process by the trajectory generation device 111 (FIG. 8).

That is, in the cost calculation process by the trajectory generation device 112, the node cost calculation unit 214 designates the current node and acquires the position and the orientations of the current node. In addition, the velocity and acceleration setting unit 212 acquires the velocity V of the current node (step S11).

Next, the grip information acquisition unit 216 acquires the grip information representing the gripping state of the gripped object T by the hand 3 of the robot 1 from the control device 14 (step S21). The grip information acquisition unit 216 sets the acceleration upper limit value $a'_{max}$ based on the acquired grip information with reference to the second acceleration upper limit value information 224 (step S22).

Next, the node cost calculation unit 214 designates the next node, and the velocity and acceleration setting unit 212 acquires the velocity V' from the current node to the next node and calculates the acceleration a from the current node to the next node (step S12).

Next, the acceleration upper limit value acquisition unit 213 acquires the acceleration upper limit value $a_{max}$ (step S13).

Next, the velocity and acceleration setting unit 212 determines whether or not the absolute value of the acceleration a calculated in step S12 is larger than the smaller one of the acceleration upper limit value $a'_{max}$ acquired in step S22 and the acceleration upper limit value $a_{max}$ acquired in step S13 (step S23). When it is determined that the absolute value of the acceleration a is larger than the smaller one of the acceleration upper limit values $a'_{max}$ and $a_{max}$ (YES in step S23), the velocity and acceleration setting unit 212 corrects the velocity V' from the current node to the next node, and accordingly corrects (recalculates) the acceleration a (step S15).

Thereafter, steps S23 and S15 are repeated or step S15 is not executed, and when the velocity and acceleration setting unit 212 determines that the absolute value of the acceleration a is not larger than the smaller one of the acceleration upper limit values $a'_{max}$ and $a_{max}$ (the absolute value of the acceleration a is equal to or smaller than the smaller one of the acceleration upper limit values $a'_{max}$ and $a_{max}$) (NO in step S23), the node cost calculation unit 214 calculates the moving time t as the cost from the current node to the next node (step S16).

Next, the node cost calculation unit 214 determines whether or not there remains a node that is not designated as the next node (step S17), and when the node cost calculation unit 214 determines that there remains a node that is not designated as the next node (YES in step S17), the process returns to step S12 to newly designate the next node and steps S12 to S17 are repeated. When the next node is designated as a node in the non-transitionable area such as the node N2 with respect to the current node N1, the processes of steps S12 to S16 are omitted.

Thereafter, when it is determined that no node that is not designated as the next node remains (NO in step S17), the node cost calculation unit 214 determines whether or not there remains a node that is not designated as the current node (step S18), and when it is determined that there remains a node that is not designated as the current node (YES in step S18), the process returns to step S11 to designate a new current node, and the processes subsequent to step S11 are repeated.

Thereafter, when the node cost calculation unit 214 determines that no node that is not designated as the current node remains (NO in step S18), the node calculation process is completed.

As described above, according to the trajectory generation process by the trajectory generation device 112, the acceleration upper limit value $a'_{max}$ is set according to the gripping state by the hand 3 of the robot 1. Further, the acceleration upper limit value $a_{max}$ is set based on the position and the orientations of the hand 3 at each node on the trajectory, and the smaller one of the acceleration upper limit values $a'_{max}$ and $a_{max}$ is adopted. Therefore, the moving velocity V' of the hand is not constant and can be changed by making use of the capability of the robot 1 while the gripped object T is prevented from sliding down, and a trajectory that can move faster can be generated.

Display Example of Output Screen 50

Figure 15:
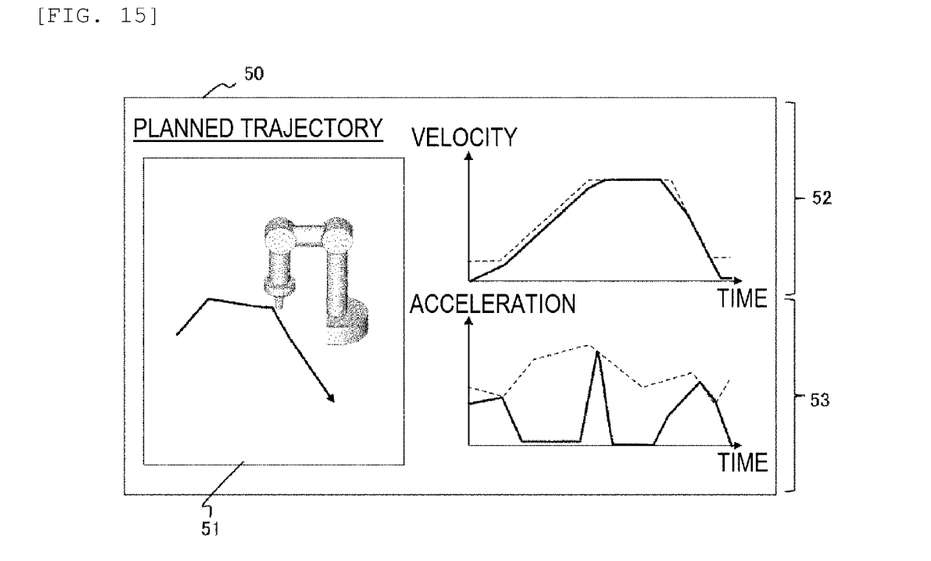
FIG. 15 is a diagram illustrating a display example of an output screen.

Next, FIG. 15 shows a display example of the output screen 50 displayed on the display unit 24 of the trajectory generation device 11.

The output screen 50 provides a trajectory display area 51, a velocity display area 52, and an acceleration display area 53.

In the trajectory display area 51, the generated trajectory and the robot 1 are displayed three-dimensionally. According to the display, the user can three-dimensionally grip the trajectory through which the hand 3 of the robot 1 passes.

In the velocity display area 52, a graph representing a change in the velocity when the hand 3 is moved on the trajectory is displayed. The horizontal axis of the graph is time (may be a distance from the start point of the trajectory), the vertical axis is velocity, a broken line is an upper limit value of the velocity, and a solid line is an actual velocity controlled by the control device 14. According to the graph, it can be seen that the velocity that was constant changes, and that the velocity can be controlled to a value close to the upper limit value over the entire trajectory.

In the acceleration display area 53, a graph representing a change in the acceleration when the hand 3 is moved on the trajectory is displayed. The horizontal axis of the graph is time (may be a distance from the starting point of the trajectory), and the vertical axis is acceleration. A broken line is an upper limit value of the acceleration, and a solid line is an actual acceleration controlled by the control device 14. According to the graph, it can be seen that the acceleration is changed in the middle of the trajectory, and the actual acceleration may reach the upper limit value, so that the capabilities the robot 1 is made use of.

The invention is not limited to the above embodiments and modifications, and includes various modifications. For example, each of the above embodiments is described in detail for easy understanding of the invention, and the invention is not necessarily limited to the embodiment including all the components described above. A part of the configuration of a certain embodiment can be replaced with the configuration of another embodiment, and the configuration of another embodiment can be added to the configuration of the certain embodiment. Another configuration may be added to a part of the configuration of each embodiment, and the part of the configuration may be deleted or replaced with another the configuration.

The invention can be provided not only in a trajectory generation device, a trajectory generation method, and a robot system, but also in various forms such as a computer readable program.

REFERENCE SIGN LIST

1: robot
2: arm
3: hand
10: robot system
11: trajectory generation device
12: work instruction device
13: imaging device
14: control device
21: trajectory generation unit
22: storage unit
23: input unit
24: display unit
25: communication unit
31 to 34: finger
50: output screen
51: trajectory display area
52: velocity display area
53: acceleration display area
111: trajectory generation device
112: trajectory generation device
211: trajectory exploration graph generation unit
212: velocity and acceleration setting unit
213: acceleration upper limit value acquisition unit
214: node cost calculation unit
215: trajectory exploration unit
216: grip information acquisition unit
221: maximum velocity information
222: first acceleration upper limit value information
223: robot information
224: second acceleration upper limit value information

The invention claimed is:

1. A robot system comprising:
a robot;
a controller which controls the robot based on a generated trajectory; and
a processor coupled to the robot;
a memory coupled to the processor, the memory storing instructions that when executed by the processor configure the processor to:
generate a trajectory exploration graph composed of a plurality of nodes for generating the trajectory, the trajectory exploration graph is two-dimensional and a horizontal axis indicates a position and an orientation of the robot and a vertical axis indicates a velocity of the robot;
acquire a first acceleration upper limit value based on an orientation and an acceleration direction of the robot at a current node;
set an acceleration and set a first velocity representing a velocity when moving from the current node to a next node adjacent to the current node based on the acquired first acceleration upper limit value;
calculate a moving time, as a cost, by using the set first velocity and the set acceleration from the current node to the next node; and
explore, based on the calculated cost, a path passing through two or more nodes in the trajectory exploration graph as the trajectory.

2. The robot system according to claim 1,
wherein the processor is configured to acquire a second velocity representing a velocity at the current node, acquire the first velocity based on a distance between the current node and an obstacle, and calculate the acceleration based on the first velocity and the second velocity.

3. The robot system according to claim 1,
wherein the processor is configured to correct the first velocity and the acceleration when an absolute value of the acceleration is larger than the first acceleration upper limit value.

4. The robot system according to claim 1,
wherein the processor is configured to refer to first acceleration upper limit value information generated in advance, and acquire the first acceleration upper limit value based on the orientation and the acceleration direction of the robot at the current node.

5. The robot system according to claim 1, wherein
the processor is configured to acquire grip information representing a gripped state of a gripped object by a hand of the robot, and acquire a second acceleration upper limit value based on the grip information, and
set the first velocity and the acceleration based on a smaller one of the acquired first acceleration upper limit value and the acquired second acceleration upper limit value.

* * * * *